United States Patent [19]
Anderson et al.

[11] 3,714,417
[45] Jan. 30, 1973

[54] BEAM FOCUS COILS FOR INDUCED EMISSION APPARATUS

[75] Inventors: Weston A. Anderson, Palo Alto; John C. Helmer, Menlo Park, both of Calif.

[73] Assignee: Varian Associates, Palo Alto, Calif.

[22] Filed: April 30, 1970

[21] Appl. No.: 33,321

[52] U.S. Cl. .......................................... 250/49.5 AE
[51] Int. Cl. .......................................... G01n 23/22
[58] Field of Search ..... 250/49.5 C, 49.5 D, 49.5 AE; 313/79, 84; 315/31; 335/210, 213

[56] References Cited

UNITED STATES PATENTS

| | | | |
|---|---|---|---|
| 2,802,111 | 8/1957 | Reisner | 250/49.5 D |
| 3,423,706 | 1/1969 | Sampson et al | 250/49.5 D |
| 3,374,346 | 3/1968 | Watanabe | 250/49.5 A |

*Primary Examiner*—William F. Lindquist
*Attorney*—Stanley Z. Cole and Vincent W. Cleary

[57] ABSTRACT

An induced electron emission spectrometer is disclosed. The spectrometer bombards a sample surface to be analyzed with radiation to induce emission of a hollow cylindrical electron beam which is analyzed and focused to a detector. A set of beam focus coils derived from an orthogonal expansion of the magnetic potential in the beam path are coaxially disposed of the beam path and energized with current to produce one or more magnetic field components within the beam path for shifting the position or changing the shape of the beam to correct for misalignment or aberrations of the beam.

9 Claims, 11 Drawing Figures

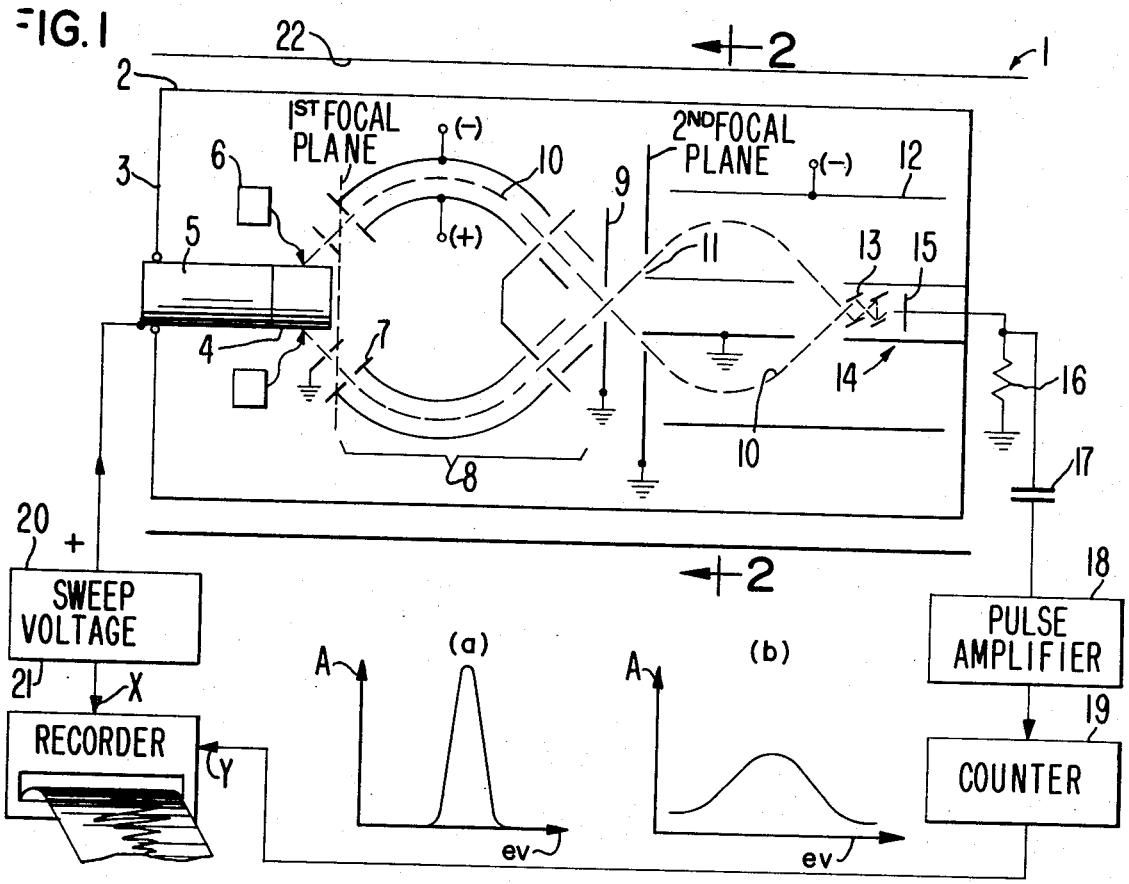
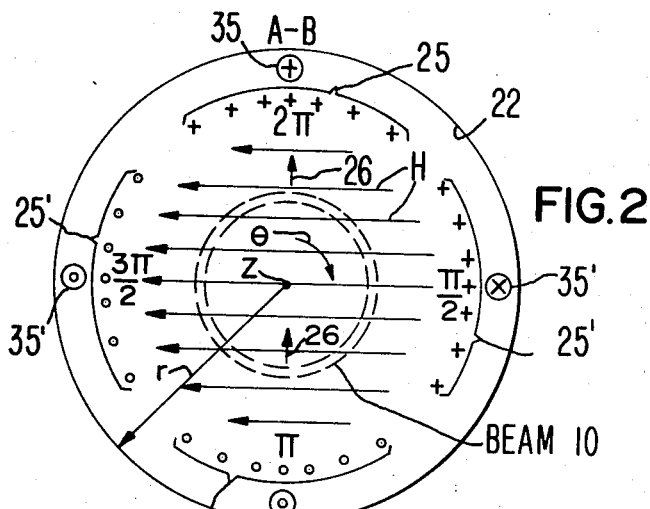
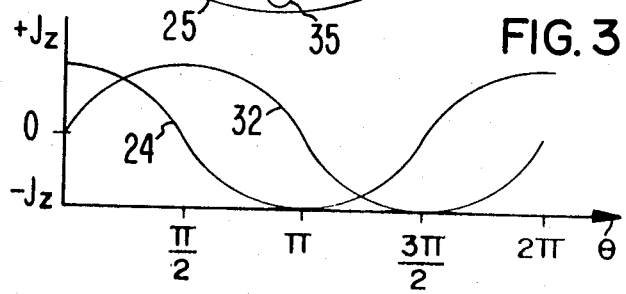
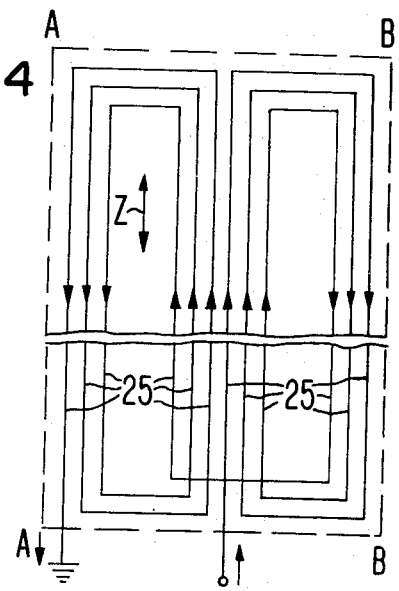
INVENTORS
WESTON A. ANDERSON
JOHN C. HELMER
ATTORNEY 3,714,417

BEAM FOCUS COILS FOR INDUCED EMISSION APPARATUS

DESCRIPTION OF THE PRIOR ART

Heretofore, induced electron emission spectrometers have employed an array of electrical beam focus electrodes disposed within the envelope of the spectrometer and closely surrounding the beam path between the exit of the beam analyzer and the annular entrance slit of the second focal plane for correcting misalignments and aberrations in the beam. Such prior art spectrometers are disclosed in copending U.S. Pat. applications, Ser. No. 763,691, filed Sept. 30, 1968, and Ser. No. 825,680, filed May 19, 1969, both assigned to the same assignee as the present invention.

While the beam focus electrode structures disposed within the spectrometer permit correction for misalignments and aberrations of the beam, the electrode structures are relatively complicated and independent correction of one aberration relative to another is difficult. In addition, the plural electrode structures are relatively complicated and it would be desirable to obtain correction for the beam by means external to the envelope of the spectrometer. It would also be desirable if the corrections could be made independent of each other such that an optimized adjustment of one control does not adversely affect a previous adjustment of another control.

SUMMARY OF THE PRESENT INVENTION

The principal object of the present invention is the provision of improved beam focus circuits for induced emission apparatus.

One feature of the present invention is the provision of an electrical circuit having a portion disposed for producing, when energized with current, a component of magnetic field within the beam path for shifting the position or changing the shape of the beam to correct for misalingment or aberrations of the beam, whereby the resolution of the induced electron emission apparatus is improved.

Another feature of the present invention is the same as the preceding feature wherein at least one of the electrical circuits defines a current path geometry having a plurality of axially directed current paths angularly displaced around the axis of the beam, and wherein the axially directed current paths are disposed to provide maximum axial current density with amplitude and sign approximately corresponding to the maximum amplitude and sign of a cosine function of the angular displacement of the axial current path about the axis of the beam, whereby an orthogonal magnetic field correcting component is produced within the beam to facilitate independent adjustment for misalignment or aberration of the beam.

Another feature of the present invention is the same as the immediately preceding feature including a second similar circuit defining similar current path geometries disposed to provide a maximum axial current density with amplitude and sign approximately corresponding to the amplitude and sign of a sine function of the angular displacement of the axial current paths, whereby adjustment of the relative current amplitude in the first and second circuits allows for a full range of corrections for aberration or misalignment of the beam.

Another feature of the present invention is the same as the immediately preceding feature wherein means are included for energizing the first and second electrical circuits with a variable dc current which when varied to increase in the first circuit decreases in the second circuit and vice-versa.

Another feature of the present invention is the same as any one or more of the preceding features wherein a magnetic shield is disposed surrounding the beam and wherein the electrical circuits for correcting the focus of the beam are disposed inside and proximate the inside wall of the shield.

Other features and advantages of the present invention will become apparent upon a perusal of the following specification taken in connection with the accompanying drawings wherein:

BRIEF DESCRIPTION OF THE DRAWINGS

FIG. 1 is a schematic, longitudinal sectional view, partly in block diagram form, of an induced electron emission spectrometer incorporating features of the present invention, FIG. 2 is a simplified sectional view of the structure of FIG. 1 taken along line 2—2 in the direction of the arrows, FIG. 3 is a plot of current density J versus angular displacement $\theta$ about the axis of the beam for two sets of coils depicted in FIG. 2, FIG. 4 is a longitudinal view of a flattened version of one of the coils of FIG. 2.

DESCRIPTION OF THE PREFERRED EMBODIMENTS

Figure 5:
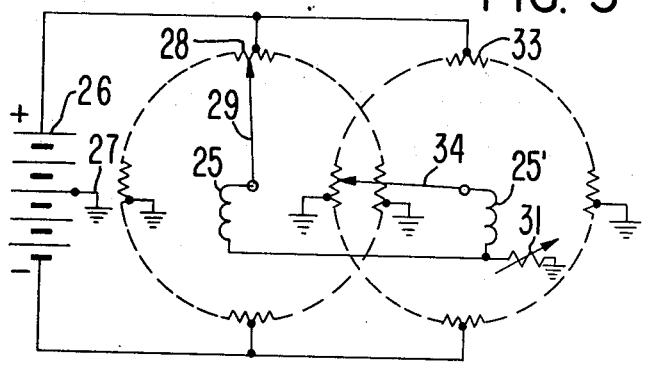
FIG. 5 is a schematic circuit diagram depicting a current source for energizing the two coils of FIG. 2.

Referring now to FIG. 1, there is shown an induced electron emission spectrometer 1 incorporating features of the present invention. The spectrometer 1 includes a hollow cylindrical envelope 2, as of nonmagnetic stainless steel, closed at its end via end closing walls 3 and evacuated to a relatively low pressure, as of $10^{-5}$ Torr, via an internal vacuum pump, not shown. The spectrometer is of the general type disclosed in the aforecited prior art patent applications.

A sample 4 to be analyzed is formed into a cylindrical member and fitted around the inner end of a probe 5 which is inserted axially into the envelope 2 and sealed to the envelope 2 in a gas-tight manner in electrically insulative relation to the wall of the envelope 2. An annular x-ray source 6 is coaxially disposed of the sample 4 and directs a beam of x-rays onto the outer surface of the cylindrical sample 4 to induce electron emission from the surface of the sample. An annular slit defining electrode 7 is disposed over the sample surface as operated at ground potential. The probe 5 and sample 4 are operated at a potential which can be swept over the whole or any part of the range between zero and plus 2,000 volts. Certain of the emitted electrons having the requisite energy to overcome the swept retarding field between the sample and slit 7 may pass through the focal plane of the beam entrance slit 7 to a beam analyzer 8.

The beam analyzer is a spherical condenser which focuses the beam 10 to and through a central aperture in a grounded plate 9, thence through a second annular slit 11 forming a second focal plane of the spectrometer 1. After passing through the second annular slit 11, the beam 10 enters a cylindrical condenser 12 which causes the electrons of the beam 10 to be focused through an entrance aperture 13 in an electron multiplier 14 for detection therein.

The detected electron current is picked up in a final detector electrode 15 and causes a pulse of current to flow through a load resistor 16 with receipt of each electron of the beam. The pulses generated across load resistor 16 are coupled by a coupling capacitor 17 to the input of a pulse amplifier 18 wherein they are amplified and fed to the input of a counter 19 for counting to derive an output voltage proportional to the number of electrons received by the detector 15. The output of the counter 19 is fed to one input of an XY recorder 21 for recording as a function of the sweep voltage applied to the sample 4 from a sweep voltage generator 20 in order to obtain an output energy spectrum of the electrons emitted from the surface of the sample under analysis. This spectrum yields information concerning the composition of the surface of the sample 4.

When the spherical condenser and other electrodes within the spectrometer 1 are in perfect position and alignment a resultant output spectral line has a line shape as shown by waveform (a) of FIG. 1, whereas when the spherical condenser 8 is out of alignment or improper voltages are applied to various electrodes the resultant electron beam 10 is out of alignment with the apertures and aberrations may appear in the beam resulting in an energy output line of reduced resolution as indicated by waveform (b) of FIG. 1.

A hollow cylindrical magnetically permeable shield 22 is coaxially disposed of the envelope 2 shielding the cylindrical beam 10 from stray magnetic fields such as the earth's magnetic field. According to the present invention, magnetic beam focus circuits are disposed on the inside wall of the cylindrical shield 22 for correcting misalignment and/or aberration of the electron beam to obtain high resolution output energy lines of the type depicted in wave form (a) of FIG. 1.

Referring now to FIG. 2-5, there is shown an electrical circuit 25 for generating a magnetic field component within the beam 10 for shifting the transverse alignment of the beam to coincide with the annular aperture 11 in the second focal plane. The magnetic beam focus circuits for correcting misalignment and aberrations of the beam 10 are derived from a cylindrical harmonic expansion of the magnetic field potential.

The field producing portions of the magnetic beam focus circuits are preferably disposed on the inside surface of the cylindrical shield 22 or on the outside surface of the cylindrical envelope 2, each current path geometry being derived from the orthogonal mathematical cylindrical expansion of the magnetic potential within the beam path such as to derive a series of cylindrical harmonic beam focus circuits, whereby the magnetic field corrections produced for focusing the beam can be independently adjusted without mutual interference with a previously obtained setting of another one of the harmonic circuits.

Due to the cylindrical symmetry of the beam 10, the useful beam deflections are those deflections which are in the radial direction $r$ with respect to the axis Z of the beam, and these to first order are produced by the $H_\theta$ components of the magnetic field produced within the beam. Thus the important magnetic field component is the one tangent to the circumference of the cylindrical beam. The radial component $H_r$ of the magnetic field produces a beam deflection along the circumference of the beam and, to first order, these deflections produce no aberrations in the image. Furthermore, aberrations in the Z direction, i.e., along the axis of the beam are to first order of no consequence.

The set of cylindrical harmonics that describe a scalar magnetic potential within a cylinder are:

$$\phi_i = \sum_n J_n(kr) \begin{Bmatrix} A_n \exp kz \\ B_n \exp -kz \end{Bmatrix} \times \begin{Bmatrix} C_n \cos n\theta \\ D_n \sin n\theta \end{Bmatrix}$$

where $J_n(kr)$ are Bessel functions of the first kind, exp $(kz)$ and exp $(-kz)$ are exponential functions, and $\cos n\theta$ and $\sin n\theta$ are sine and cosine functions. The scalar magnetic potential on the exterior of a cylinder can be described by:

$$\phi_o = \sum_n Y_n(kr) \begin{Bmatrix} A_n' \exp (kz) \\ B_n' \exp (-kz) \end{Bmatrix} \begin{Bmatrix} C_n' \cos n\theta \\ D_n' \sin n\theta \end{Bmatrix}$$

where $y_n(kr)$ are Bessel functions of the second kind.

The relationship of the potentials on the inside $\phi_i$ and outside $\phi_o$ of the cylinder are determined by matching boundary conditions such that the equations:

$$\nabla \times H = J, \nabla \cdot B = 0$$

hold across the boundary. Here $J$ is the surface current density at the boundary between $\phi_i$ and $\phi_o$. The magnetic field $H$ is related to the scalar magnetic potential $\phi$ through the relationship $$H = -\nabla \phi.$$

In the case of a cylinder which is long when compared to the diameter, for example the length being twice the diameter, a good approximation may be obtained by using the circular harmonic functions:

$$\phi_i = \Sigma_n r^n (A_n \cos n\theta + B_n \sin n\theta)$$

for the potnetial on the inside of the cylinder and $$\phi_o = \Sigma_n r^{-n} (A'_n \cos n\theta + B'_n \sin n\theta)$$

for the potential outside of the cylinder. In this case the boundary conditions for the currents on the sides of the cylinder are $$H_{i\theta} - H_{o\theta} = J_z, H_{ir} = H_{or}.$$

It may be shown that the first circular harmonic of the magnetic field is a uniform transverse field whose direction in the transverse plane ($r\theta$ plane) may be chosen so as to center the circular image of the beam 10 on the circular aperture 11 at the second focal plane. By matching boundary conditions at the cylindrical boundary 22 on which the current paths are to lie, the current density $J_z$ per unit length in the $\theta$ direction can be derived. For a uniform transverse field, i.e., the first harmonic, current density $J_z$ is proportional to cos $\theta$. Thus if each wire carries the same current, the $\theta$ density of wire is approximately cos $\theta$, as shown by cos $\theta$ wave 24 of FIG. 3. The corresponding density of current carrying wires, assuming the same current flow through each wire, is shown in FIG. 2 by the plus (+) and solid dot (⊙) marks indicating current flowing into and out of the paper respectively. FIG. 4 shows the current path for the wire 25 of FIG. 2 by cutting the cylinder 22 along the Z direction and flattening the sheet to clearly show the configuration of wire 25. The two edges of the flattened cylinder AA and BB are joined together at a seam corresponding to $\theta = 0$ and $2\pi$.

The uniform magnetic field component produced by the circuit of FIG. 4 is a uniform transverse field, indicated by arrows marked H in FIG. 2, and produces a transverse shift of the annular beam as indicated by arrows 26. The $\theta$ directed component of the wire 25 at the ends of the shield 22 produce an undesired axial component of magnetic field but these undesired end effects are removed sufficiently from the beam 10 such as not to adversely affect focusing of the beam.

The direction of the uniform magnetic field H can be changed to change the transverse shift of the beam by mounting the wire 25 on a rotatable cylindrical coil form disposed inside of shield 22. By rotation of the coil form in the $\theta$ direction, the direction of the magnetic field is changed accordingly. By rotating the coil form 360° a full 360° transverse adjustment or shift of the beam is possible. Alternatively, the coil form, not shown, could be rotatable by 180° and the current through the field corrective circuit 25 reversed to obtain a full 360° adjustment in the transverse alignment of the beam.

A suitable circuit for energizing circuit 25 is shown in FIG. 5. The energizing circuit includes a source of current, such as battery 26, provided with a grounded center tap 27. The output of the battery 26 is connected across a circular potentiometer 28, the rotatable wiper contact 29 of which is connected to the input terminal of circuit 25 with the output terminal of circuit 25 being connected to ground via an adjustable resistor 31. The direction of the magnetic field is thus controlled by rotation of the circuit 25 about the Z axis and the amplitude of the resultant beam shift is controlled by varying the amplitude of the current through the corrective circuit 25 via variable resistor 31. Alternatively, the wiper blade 29 can be swept around the potentiometer to vary the intensity and sign of the current while the direction of the field is changed by rotation of coil 25.

As an alternative to the use of only a single circuit 25 and rotating the circuit, the same effect can be obtained electrically by provision of a second circuit 25' having an axial directed current density $J_z$ as a function of $\theta$ determined by sin $\theta$. This current distribution is depicted by curve 32 of FIG. 3 and the coil circuit 25' is substantially identical to that of FIG. 4 rotated by 90° in the clockwise direction as shown in FIG. 2, where (x) marks the presence of a conductor carrying current directed into the paper and the circle (o) indicate the presence of a conductor carrying current directed out of the paper.

The electrical circuit for energizing the sin $\theta$ coil 25' is shown in FIG. 5 and comprises a second circular potentiometer 33 with its wiper blade 34 mechanically interconnected to the first wiper blade 29 of the first potentiometer 28 for rotation therewith but being displaced therefrom in the counter-clockwise direction by 90°. The 90° and 270° positions on each potentiometer 28 and 33 are grounded. By rotation of the wiper blades 34 and 29 in the clockwise direction, the current through the first circuit 25 is seen to start from a position of maximum current while circuit 25' has zero current and to decrease with rotation in the clockwise direction while at the same time the current through the second circuit 25' is seen to increase to a maximum current when the current is the first circuit 25 has reduced to zero. Thus, by rotation of the wiper blades 34 and 29 a complete 360° adjustment in the transverse displacement of the electron beam 10 is obtainable. The degree of displacement is variably controlled by varying the magnitude of the current through the two coils by adjustment of resistor 31.

The beam focus circuits 25 and 25' can be considerably simplified by replacing the multiple turns of wire with single conductors disposed at the positions of maximum intensity of the sin $\theta$ and cos $\theta$ functions 32 and 25. Coil 25 would be replaced by a circuit having conductor portions 35 and coil 25' would be replaced by electrical circuit having conductive portions 35', as shown in FIG. 2.

Figure 7:
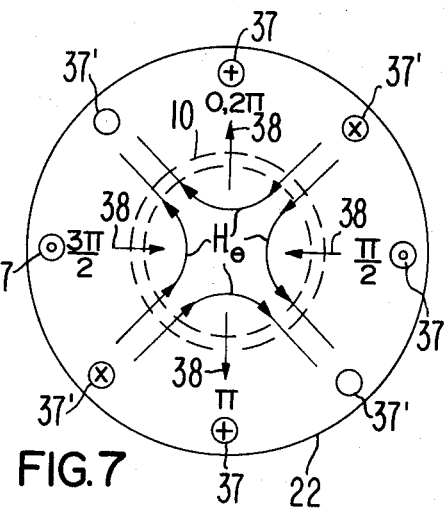
FIG. 7 is a sectional view similar to that of FIG. 2 depicting the positioning of the coils to approximate the current density distributions of FIG. 6.
Figure 6:
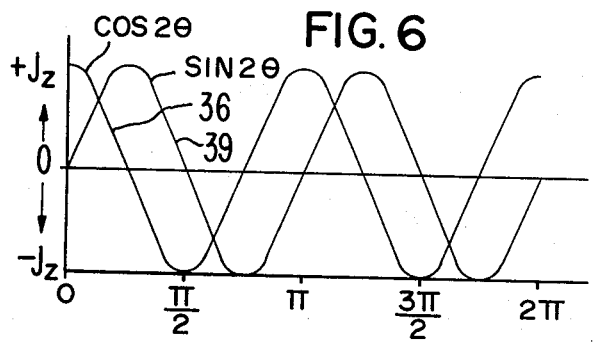
FIG. 6 is a plot of current density versus angular displacement about the longitudinal axis of the beam for a second harmonic arrangement of beam focus coils.
Figure 8:
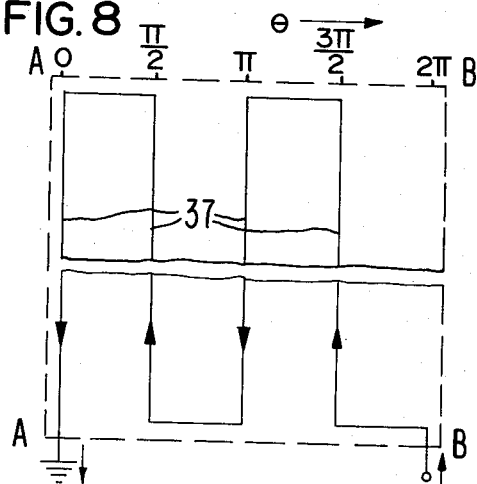
FIG. 8 is a flattened longitudinal side view for one of the coil circuits of FIG. 7.

Referring now to FIGS. 6–8, it can be shown that an eliptically-shaped distortion of the beam 10 can be corrected by a second harmonic $\theta$ directed component of the magnetic field $H_\theta$ within the beam path. The second harmonic solution of the circular expansion of the magnetic field results in current solutions characterized by Z directed currents at the surface of the cylinder 22 having a current density distribution $J_z$ as a function of $\theta$ shown by curve 36 of FIG. 6. Thus, the current density in the Z direction $J_z$ has a cos $2\theta$ distribution which is approximated by electrical circuit 37 of FIGS. 7 and 8. Circuit 37 produces $\theta$ components of magnetic field within the beam as indicated by arrows designated $H_\theta$ in FIG. 7 and results in forces on the electron beam as indicated by arrows 38. This type of corrective force corrects for eliptical distortion of the beam.

As in the circuits of FIGS. 2–5, one circuit 37 may be employed on a coil form rotatable about the Z axis or, as an alternative, an additional second coil 37' may be employed. The additional coil would correspond to the axial current density distribution $J_z$ of sin $2\theta$, indicated by curve 39 of FIG. 6 and is essentially the same as the current path geometry 37 of FIG. 8 with the exception that the circuit is rotated by 45° in the clockwise direction about the Z axis. Coils 37 and 37' would then be connected in a second circuit substantially the same as that of FIG. 5 where coils 25 and 25' are replaced by coils 37 and 37'. By rotation of the two wiper blades 34 and 29 and adjustment of resistor 31, correction for the second harmonic radial aberration of the beam, any tendency for the beam to be eliptical in shape, is corrected.

As in the circuit 25 and 25' of FIG. 2–4, circuits 37 and 37' may comprise a distribution of axially directed wires with cos $2\theta$ and sin $2\theta$ density as a function of $\theta$ for a more accurate approximation of the desired second harmonic magnetic field component within the beam.

Figure 9:
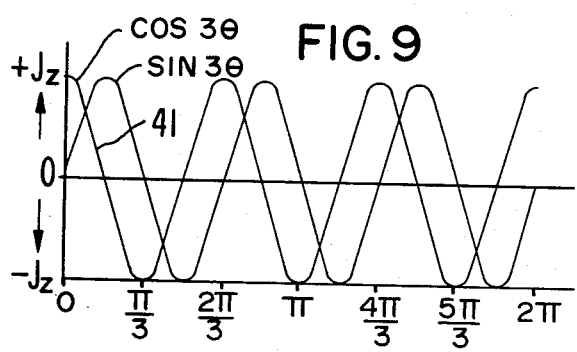
FIG. 9 is a plot of current density versus angular displacement about the axis of the beam for a third harmonic set of beam focus coils.
Figure 10:
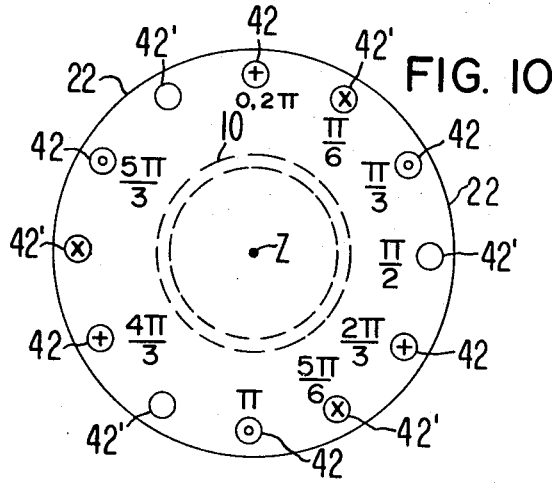
FIG. 10 is a sectional view similar to that of FIGS. 2 and 7 depicting the third harmonic coils of FIG. 9.
Figure 11:
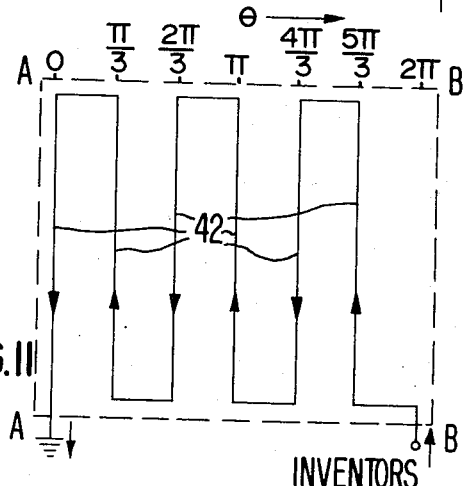
FIG. 11 is a flattened side elevational view for one of the coil sets of FIG. 10.

Referring now to FIGS. 9–11, there is shown the configuration of current distribution of a beam focus circuit for correcting for third harmonic radial aberrations of the beam. The third harmonic axial current density distribution $J_z$ as a function of $\theta$ to produce the third harmonic magnetic field component within the beam is shown in FIG. 9 as cos $3\theta$ by curve 41. The electrical circuit for generating the current density distribution $J_z$ defined by curve 41 is shown by circuit 42 of FIGS. 10 and 11.

As previously shown with regard to the first and second harmonic circuits of FIGS. 2–8, third harmonic circuit 42 may be positioned upon a rotatable coil form rotatable about the Z axis, or, as an alternative, a second additional coil 42', having a substantially identical configuration to first coil 42 but rotated in the $\theta$ direction by 30°. The wires are energized by the circuit of FIG. 5 where circuits 42 and 42' are substituted for circuits 25 and 25', respectively. This allows a complete correction for third harmonic aberrations of the beam 10.

Also, a single conductor 42 or 42' need not be employed but the desired current density distribution may be obtained by a distribution of axially directed wires having a density as a function of $\theta$ determined by cos $3\theta$ and sin $3\theta$, as previously described with regard to the embodiments of FIG. 2–7.

Higher order radial aberrations in the beam, i.e., fourth, fifth, etc., can be corrected in the same manner as that previously taught with regard to FIGS. 2–11 by arranging circuits on the inside of the shield 22 having axial current density distributions J as a function of $\theta$ corresponding to cos $n\theta$ and sin $n\theta$ where $n$ is the harmonic beam distortion to be corrected. Each harmonic circuit of cos $n\theta$ and sin $n\theta$ currents would be connected to a separate circuit of the type shown in FIG. 5 where the cos $n\theta$ circuit is substituted for coil 25 and the sin $n\theta$ circuit is substituted for coil 25.

The method described above can equally well be applied to cases where the beam corrective currents are confined to a section of a sphere. In this case, it is convenient to expand the scalar magnetic potential in spherical harmonics rather than cylindrical or circular harmonics. To a first approximation the location of the points of maximum current density $J_z$ are at the same angle $\theta$ for the cylindrical and spherical cases.

Although the description, thus far, has been directed to correcting annular electron beams, the teachings herein are equally applicable to cylindrical beams of charged particles in general. Such beams may be solid or hollow and electrons or ions. Also, the beam focus circuits have thus far been described as employed with an induced electron emission spectrometer 1 but the teachings herein are equally applicable to other devices generating cylindrical beams of induced emission such as a retarding field electron defraction spectrometer of the type disclosed in U.S. Pat. No. 3,313,936, issued Apr. 11, 1967, and assigned to the same assignee as the present invention. Also, in the induced electron emission spectrometer 1 of FIG. 1, the induced electron emission need not be generated by x-ray bombardment of the sample 4 but may be generated by radiation of the sample 4 with ultraviolet or by electrons, the latter being the case in the electron defraction spectrometer. Also, the beam 10 need not be a complete cylinder, it may comprise a part of a cylinder such as a semicylinder.

The advantage of employing beam focus circuits derived from an orthogonal expansion of the magnetic potential is that the resultant different harmonic circuits are orthogonal, i.e., substantially no mutual interference is obtained between the adjustments of the beam focus produced by the separate different harmonic circuits, such that adjustment of one circuit does not interfere with a previous optimum adjustment of another.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an induced emission apparatus, means for positioning a sample to be examined in an evacuated envelope, irradiative means for directing a circular beam of radiation onto the sample to be examined for inducing emission of charged particles from the irradiated sample, electrode means for forming the emitted particles into a cylindrical or partially cylindrical beam producing an annular image, detector means for detecting the beam, the improvement comprising, electrical circuit means having a portion disposed for producing when energizing with current a component of magnetic field within the beam path for shifting the position or changing the shape of the cylindrical beam to correct for misalignment or abberation of the beam wherein said circuit means includes a first circuit defining a current path geometry having a plurality of axially directed current paths angularly displaced around the axis of the beam, and wherein said axially directed current paths are disposed to provide maximum axial current density at locations corresponding to extrema of a cos function of the angular displacement of the axial current path around the axis of the beam.

2. The apparatus of claim 1 wherein said cos is a function of $\theta$, where $\theta$ is the angular displacement about the axis of the beam taken from a reference direction coinciding with a point of maximum axial current density for said circuit means.

3. The apparatus of claim 2 wherein said cos is a function of a harmonic of $\theta$.

4. The apparatus of claim 1 wherein said circuit means includes a second circuit defining a second current path geometry having a plurality of axially directed current paths angularly displaced about the axis of the beam, and wherein said second axially directed current paths are disposed to provide a maximum axial current density at locations corresponding to extrema of a sin function of the angular displacement of the axial current path about the axis of the beam relative to the angular position of said first circuit means.

5. The apparatus of claim 4 wherein said sin is a function of $\theta$, where $\theta$ is the angular displacement about the axis of the beam path taken from a reference direction coinciding with a point of maximum axial current density for said first circuit.

6. The apparatus of claim 5 wherein said sin is a function of a harmonic of $\theta$.

7. The apparatus of claim 4 including means for energizing said fist and second circuits with a variable dc current which when varied to increase in said first circuit means decreases in said second circuit means and vice-versa.

8. The apparatus of claim 1 including means for varying the current through said circuit means for varying the position or shape of the beam.

9. The apparatus of claim 1 including a magnetic shield means surrounding said beam path and wherein said circuit means is disposed proximate the inside surface of said shield means.

* * * * *